Oct. 3, 1950  E. FERMI  2,524,379
NEUTRON VELOCITY SELECTOR
Filed Sept. 18, 1945  3 Sheets-Sheet 3
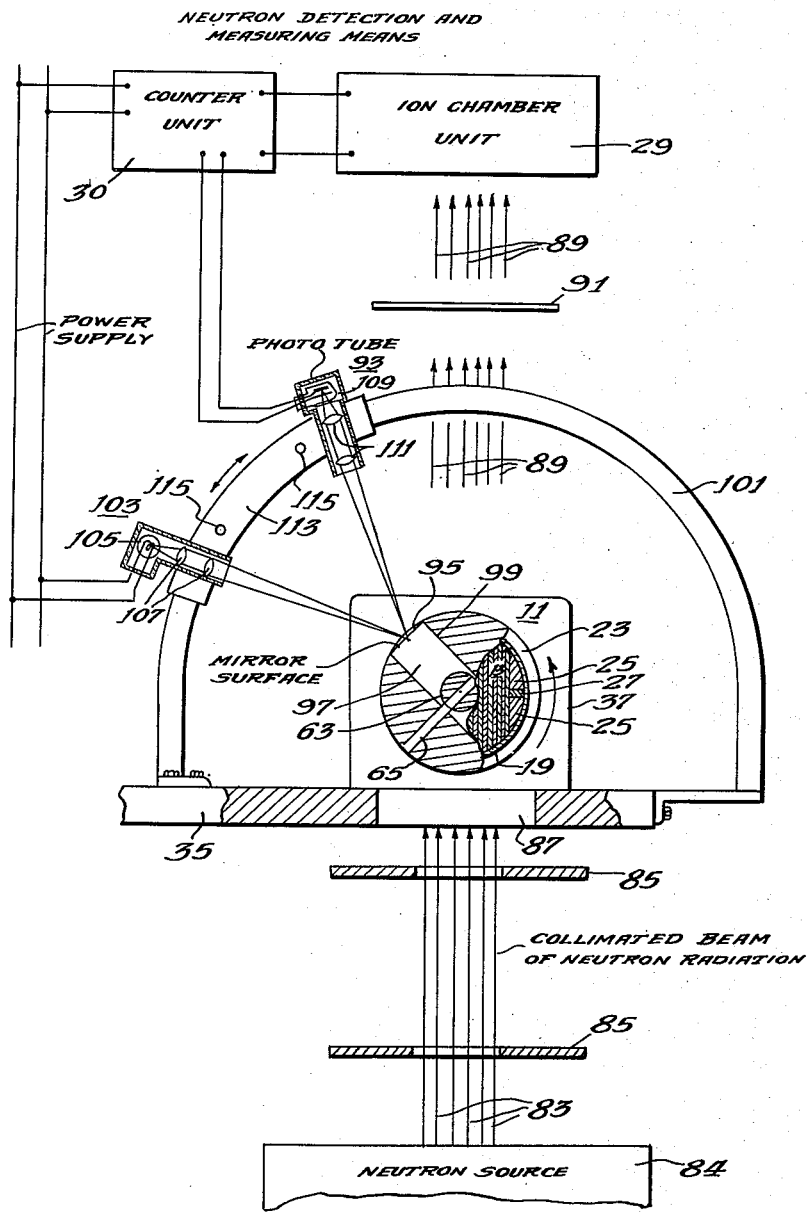

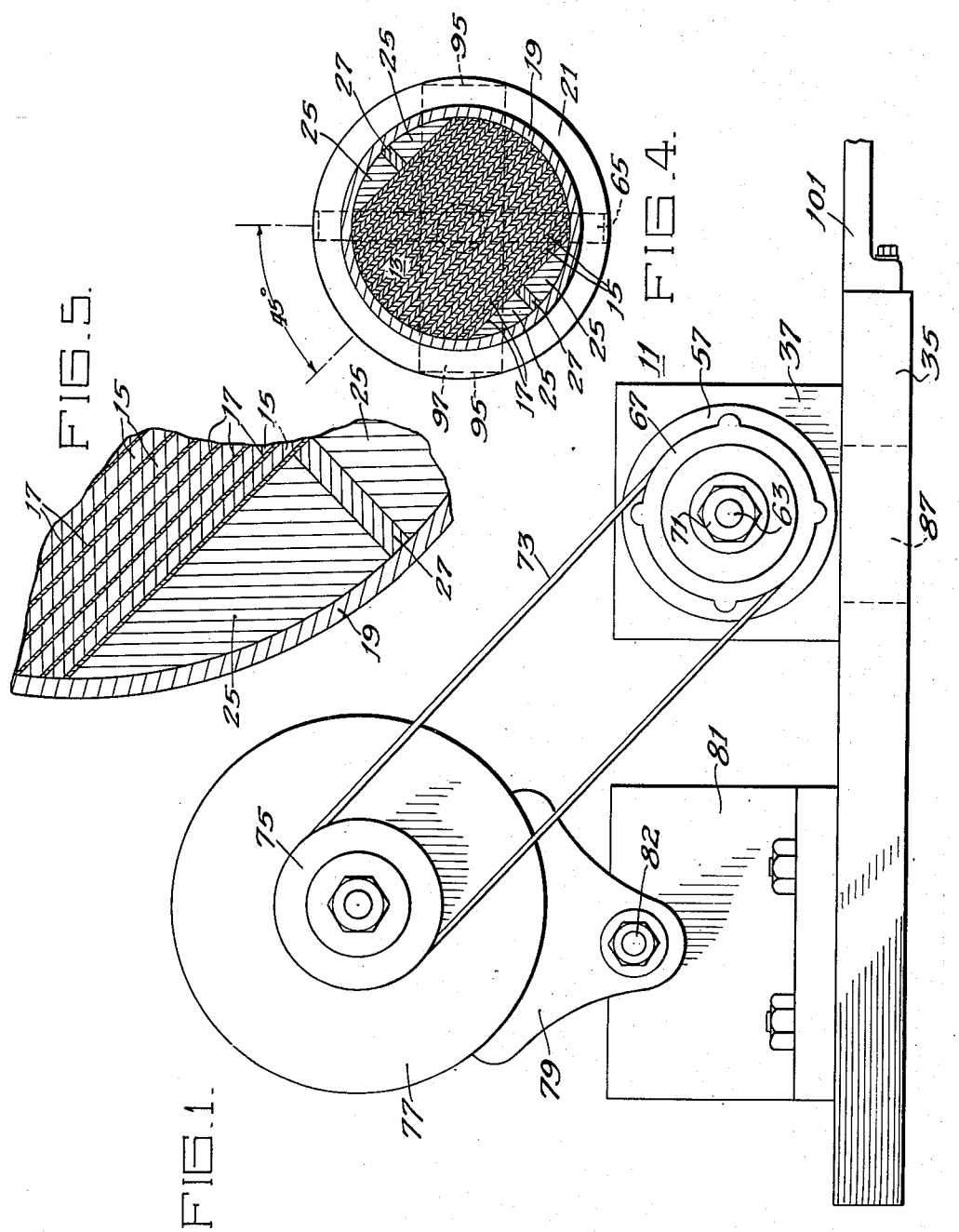

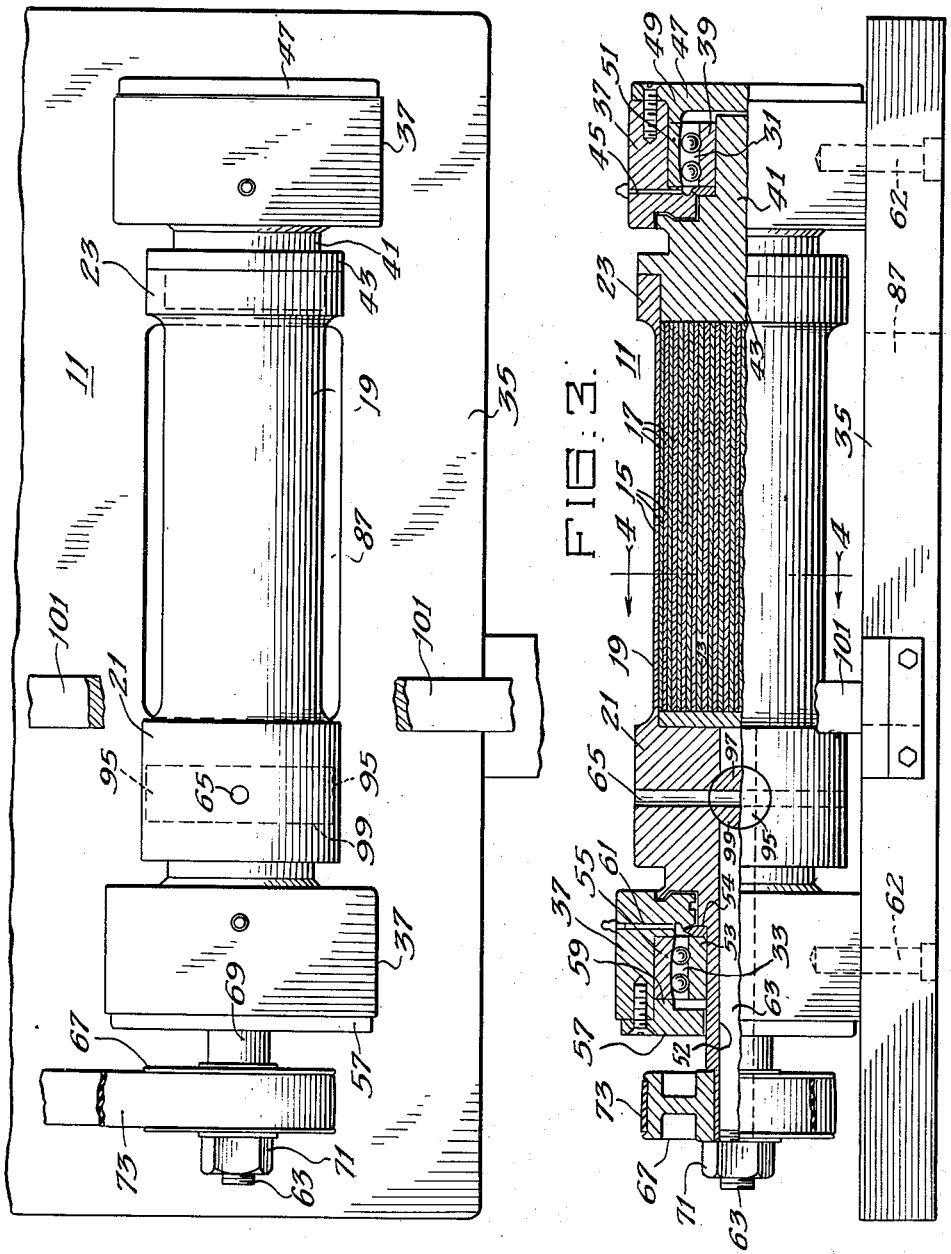

Patented Oct. 3, 1950

2,524,379

UNITED STATES PATENT OFFICE 2,524,379

NEUTRON VELOCITY SELECTOR

Enrico Fermi, Santa Fe, N. Mex., assignor to the United States of America as represented by the United States Atomic Energy Commission Application September 18, 1945, Serial No. 617,121

19 Claims. (Cl. 250—83.6)

The present invention relates to neutron velocity selector apparatus and particularly to apparatus of this type which utilizes a rotating shutter.

In various physical investigations it is necessary to measure the numbers and effects of neutrons at various velocities. The usual apparatus for accomplishing this includes a beam source of neutrons, neutron detection or measuring means, and a device known generally as a neutron velocity selector which is located intermediate the beam source and the detection or measuring means. The neutron velocity selector includes a shutter means for periodically interrupting the neutron beam and means for preventing the activation of the neutron detection and measuring means except for short periods of time following each opening of the shutter, velocity selection of neutrons being thereby effected. The best known type of neutron velocity selector employs a rotating shutter which is so designed that neutrons are passed during a portion or portions of each rotation of the shutter, the shutter effectively blocking all neutron radiation at other times. With this apparatus, there is used a mechanical timing mechanism operable to activate the neutron detection or measuring means at the desired time following each opening of the shutter, and reasonably satisfactory results have been obtained with this arrangement.

There are, however, serious inherent limitations in mechanical timing devices of this character and in the other known prior apparatus, and these limitations act to so restrict the range of operation and the accuracy of the devices that there is a great existing need in the art for an improved neutron velocity selector. Accordingly, a principal object of the present invention is to produce a novel improved neutron velocity selector, and particularly a velocity selector which shall be simple in design and easy to operate, and which shall be free of the undesirable limitations and deficiencies of the known prior structures.

As will hereinafter appear, this object is accomplished by the provision of a neutron velocity selector apparatus which utilizes a novel improved rotating shutter of special design and which employs an electronic, photoelectrically controlled means, for effecting the activation and the deactivation of the associated neutron detection and measuring means at predetermined times following the opening and the closing of the shutter. The particular shutter involved and the combination of that shutter wih an electronic timing means, while producing a simple, substantially completely automatic instrument, greatly increases the fundamental accuracy of the selector apparatus and at the same time greatly extends its useful range of operation.

The various novel features and structural combinations which contribute to the successful operation of the apparatus of the invention will be made more apparent in the following description and the accompanying drawings of one preferred embodiment thereof. In the drawings, Fig. 1 is an end elevation of the rotatable shutter unit and the driving motor therefor of a velocity selector constructed in accordance with the teachings of the present invention;

Fig. 2 is a plan view of the rotating shutter shown in end elevation in Fig. 1;

Fig. 3 is a side elevation view partially in section of the shutter unit of Figs. 1 and 2;

Fig. 4 is a sectional view on the line 4—4 of Fig. 3;

Fig. 5 is an enlarged fragmentary cross-sectional view showing certain of the details of construction of the shutter unit; and Fig. 6 is a diagrammatic view illustrating a neutron velocity selector apparatus which includes a rotating shutter unit and a photoelectric timing means in accordance with the present invention.

The features of the rotating shutter unit are illustrated in Figs. 1 to 5. The active portion of this unit comprises a fabricated, cylindrical member 11 having a laminated central portion 13 which consists of a plurality of superposed, alternate laminations 15 and 17 of sheet aluminum and thin cadmium sheet or foil, respectively. In Figs. 3, 4 and 6 the solid lines between cross-hatched spaces represent the cadmium sheets 17, since the thickness thereof is only a small fraction of the thickness of the aluminum sheets 15, as is pointed out below. The laminations 15 and 17 are held in proper relation within a thin walled, cylindrical, tubular support 19 which is of aluminum or other material having low neutron capture capabilities and which has a relatively heavy, solid hub 21 at one end thereof and a hollow hub 23 at the other end. The laminations 15 and 17 which comprise the central portion 13 of the shutter unit are held centrally of the tubular support 19 by four, suitably shaped, arcuate, spacer strips 25, preferably of metal, which extend for the full length of the laminations and which are held apart by elongated radially positioned shield strips 27 of cadmium or other material having high neutron capture capabilities. To obtain a balanced unit which can be rotated at high speed without excessive vibration, the laminations 15 and 17 are symmetrically disposed within the hollow, cylindrical support 19, and the surface planes thereof extend parallel to the longitudinal axis of the support, as illustrated.

In a particularly satisfactory embodiment of the invention, the aluminum laminations 15 were approximately 4¾" long with a maximum width along the diameter of the support 19 of about 2 inches. The laminations 15 were cut from a $\frac{1}{32}$ inch aluminum sheet, and the cadmium sheet or foil laminations 17 which were interposed between the aluminum sheets 15 had a thickness of the order of .004 to .008 inch.

The aluminum laminations provide a relatively low loss path through the shutter in the shutter position where the laminations align with the direction of movement of the neutrons. The thickness of cadmium is sufficient to cause the shutter to block all neutrons incident thereon, except those of extremely high velocity, when the shutter is turned more than about 1½ degrees from the position where the laminations align with the direction of movement of the neutrons. The cadmium shield strips 27 in this embodiment of the invention were $\frac{1}{8}$ of an inch thick. The sole function of the shield strips 27 is to provide shielding at the side portions of the shutter which prevents neutron transmission in those areas when the shutter is in operation.

While the use of alternate cadmium and aluminum laminations is preferred in the shutter construction, it will be understood that other materials can be used. The important requirement is that there shall be alternate laminations of material which has high neutron capture capabilities, for example, cadmium, boron, or gadolinium, and parallel laminations of a material having low capture capabilities, such as aluminum, magnesium, or beryllium, to provide a neutron path through the shutter.

In order to utilize the apparatus successfully without greatly extending the distance from the shutter to the neutron detection and measuring means, which may include an ion chamber unit and a counter unit as illustrated generally at 29 and 30 in Fig. 6, it is desirable to rotate the shutter at high speeds, those of the order of 10,000 to 15,000 R. P. M. being frequently encountered. To facilitate the convenient obtaining of speeds of this order, the active portion 11 of the shutter is supported for free rotation about the longitudinal axis thereof by means of a pair of precision bearings 31 and 33 which are in turn supported upon a rigid base 35 by means of suitable bearing blocks 37. The inner race 39 of the bearing 31 at the hollow hub end of the shutter tube 19 engages a suitable stub shaft member 41 having an enlarged end 43 which is press fitted into the hollow hub 23 of the support tube 19 for the shutter laminations 15 and 17. The inner end portion 43 of this stub shaft 41 serves the further function of holding the shutter laminations in place. Lubricant is admitted to the bearing 31 through a suitable passageway 45, and the outer end of the bearing assembly is closed by means of a plate member 47 having an internal rib 49 for holding the outer race 51 of the bearing 31 properly seated against the bearing block 37.

The bearing construction at the other end of the shutter is substantially identical to the structure just described, except that in this instance the shaft 52 which engages the inner race 53 of the bearing 33 is hollow and is formed integrally with the hub 21 at the end of the shutter tube 19. The inner race 53 abuts against an oil thrower 54 which in turn abuts against a suitable shoulder provided on the bearing shaft 52, and the outer race 55 is held in position in the bearing block 37 by an outer cap member 57 having an internal rib 59 similar to the member 49 previously described. Lubricant is admitted through a suitable passageway 61.

The bearing blocks 37 are both rigidly bolted to the base 35 by suitable bolt members 62 as indicated in Fig. 3. If desired, dowel pins (not shown) may be used to assure accurate positioning of the bearing blocks 37 relative to the base 35. Motive power is applied to the shutter mechanism by means of a short shaft 63 which is press fitted into the hollow shaft 52 of the shutter tube 19 and is keyed thereto by a pin 65. The axis of the shaft 63 is concentric with the axis of the shutter.

Externally of the bearing support and end closure at this end of the shutter there is a belt pulley 67 which is supported upon and keyed to the shaft 63 by a suitable spacer and keying member 69 and a nut 71, which engages a threaded portion on the outer end of the shaft 63. The pulley 67 is mechanically connected by a belt 73 to the drive pulley 75 of a suitable variable speed motor 77 which is adjustably supported upon the base 35 by means of a bracket 79 affixed to the motor frame, an angle iron 81 affixed to the base 35, and a hinge bolt connection 82 which permits convenient adjustment of the position of the motor (Fig. 1). It is intended that pulleys of various diameters may be applied to the drive shaft 63 at the drive end of the shutter and to the drive shaft of the motor 77. The adjustable support provided by the connection 82 facilitates the changing of pulleys and the obtaining of correct belt tension after such change has been made.

During the operation of the device, as has been previously pointed out, it is contemplated that the rotatable shutter shall be placed in the path of a beam of neutron radiation, most conveniently a collimated beam, and that the beam, after having been periodically interrupted as the shutter rotates, shall impinge upon an ion chamber or neutron detecting means. Such an arrangement is illustrated diagrammatically in Fig. 6, where the arrows 83 represent a collimated beam of neutron radiation which originates in a suitable source, such as a neutronic reactor, indicated generally at 84, and which passes through suitably orificed shield or collimating plates 85 arranged to limit the dimensions of the beam to a width not greater than that of the laminated central portion 13 of the shutter. The beam of neutron radiation after passing through the shield plates 85, and a suitable opening 87 in the base 35, reaches the central portion 13 of the shutter and during those periods when the laminations 15 and 17 are in line with direction of neutron movement in the neutron beam, neutron radiation, as indicated by the arrows 89, will pass through the shutter and reach the ion chamber 29. Material under test may be located at a sample position illustrated at 91. The ion chamber 29 is connected to a suitable indicating apparatus such as the counter mechanism indicated at 30.

In order for the apparatus to be susceptible of convenient use, it is necessary that means be provided for timing the operation of the indicator or counter. The only result of the operation of the shutter is to periodically interrupt the neutron beam in such manner that the neutron radiation of the beam is transmitted through the shutter only during periods of time roughly equal to 1/240 of the period of time required for each revolution of the shutter, these openings of the shutter to transmit neutron radiation occurring at exactly the same point during each half revolution thereof. Having available an interrupted neutron beam of this character, it becomes apparent that if some means be available for activating the neutron detection or measuring means at a predetermined time following each opening of the shutter, the activation persisting for a very short interval only, it will be possible to select and study the effects of neutron radiation of various velocities. In the prior known arrangements, attempts have been made to accomplish this selection by timing means which utilizes mechanical expedients, but as previously indicated, these mechanical arrangements are of limited capability and utility.

The apparatus of the present invention utilizes an electronic, photoelectrically controlled, timing mechanism, which, although of simple design, is capable of extremely accurate operation over a much greater range of velocity than has heretofore been considered possible. This timing means includes a photocell control unit 93 which is adapted to be energized to effect activation of the neutron detection and measuring means in response to a beam of light reflected into the photocell by one of a pair of diametrically spaced mirrors 95 which are carried by the rotating shutter. The mirrors 95 are provided by polishing a mirror surface at either end of a pin 97 which is supported in the solid hub 21 at the drive end of the shutter tube 19. The pin 97 and the hole 99 within which it fits are accurately ground so that the flat mirror surfaces 95 are perpendicular to the longitudinal axis of the pin 97 and so that the longitudinal axis of the pin intersects the axis of rotation of the shutter and is accurately positioned relative to the parallel planes of the laminations 15 and 17. While almost any relative positioning of the mirror pin 97 and the laminations 15 and 17 may be used, it has been found convenient to displace the axis of the mirror pin 45 degrees from the planes of the laminations, and such an arrangement is illustrated in the drawings. The axis of the mirror pin 97 is preferably at right angles of the axis of rotation of the shutter, and the mirror pin may be conveniently held in place by the taper pin 65 which locks the shaft 63 in position. It will be noted that the inner end of the shaft 63 also passes through the mirror pin 97, but this is of no constructional importance.

To permit convenient adjustment of the timing interval and thereby further facilitate the use of the apparatus, an arcuate support 101 is provided for the photocell control unit 93 and the beam light source 103 used in conjunction therewith. The arcuate support 101 is bolted to the base 35 and is concentric to the axis of rotation of the shutter unit, and is preferably located in a plane which is parallel to the plane of revolution of the longitudinal axis of the mirror pin 97, as is illustrated in the drawings. The beam light source 103 is of unitary construction and includes a source of light 105 and suitable collimating lenses 107. The photocell unit 93 includes a phototube 109 and a similar set of collimating lenses 111. A common support 113 which slidably engages the main arcuate support 101 is provided for both the photocell and the light source units. The optical constants of the beam source 103 and the photocell unit 93 are such that a spot of light will be concentrated on the mirror surface 95 at one end of the mirror pin 97 and will be reflected into the phototube 109 at each instant when the axis of the mirror pin 97 is midway between the beam source 103 and the phototube unit 93, i. e., once during each half revolution of the shutter. Further, since the main arcuate support 101 for the light beam source and photocell assemblage is concentric with the axis of rotation of the shutter, and parallel to the plane of rotation of the axis of the mirror pin 97, this condition will pertain for any position which the light beam source and photocell assemblage may occupy along the arcuate support 101.

The phototube 109 is connected to the counter unit 30 so as to effect a triggering activation of that unit during each of the very short periods when the phototube is illuminated. As is well known in the art, the operation of an electronic circuit of this character involves a time interval of the order of only a few microseconds, and it will be apparent that the arrangement permits extremely accurate timing. Further, since the light beam source and photocell assemblage may be moved a full 180° relative to the neutron admitting position of the shutter, it is possible to vary the timing over the complete operative range of the device.

In the position shown in Fig. 6, the light beam source and photocell combination is in position to trigger and activate the neutron detection and measuring means at the instant the shutter opens. This is the maximum time interval which is practical in operation of the device since the only neutrons which will affect the ion chamber in this instance are those which were released during the last opening of the shutter, and obviously, these will be neutrons of the slowest type. If the position of the light beam source and photocell assemblage is moved in either direction from the position illustrated in Fig. 6, the triggering will take place so as to decrease the time interval and to indicate or measure the effect of neutrons which reach the ion chamber in a lesser interval of time. Knowing the speed of rotation of the shutter, the distance from the shutter to the ion chamber or other detection unit, and the relative angular position of the light beam source and photocell assemblage, it is possible to determine the velocity of the neutrons whose effect is being observed to a very high degree of accuracy. In an apparatus having the shutter dimensions previously described and operating at reasonably obtainable speeds of rotation with a separation of the shutter and ion chamber of 2 to 10 meters, for example, it is possible to accurately separate and measure neutrons at velocities up to 6,000 or 7,000 meters per second, which is far beyond the range of any of the known selector mechanisms using mechanical timing means for activating and deactivating the neutron detection and measuring means.

In the foregoing there has been described a new and improved neutron velocity selector apparatus which possesses important advantages over the prior known devices. The particular features of the invention which are believed to be new are expressly pointed out in the appended claims.

What is claimed is:

1. In apparatus of the class described, means for alternately blocking and permitting to pass a neutron stream, said means comprising a plurality of superposed, alternate laminations of sheet material having high neutron capture capabilities and sheet material having low neutron capture capabilities, means supporting said laminations for rotation about an axis which is parallel to the surface planes of said laminations, means for detecting neutrons permitted to pass by said first means, and means for counting detected neutrons of predetermined energy during predetermined periods of time, said counting means including reflecting means rotating with said first means.

2. In apparatus of the class described, shutter means for alternately blocking and permitting to pass a neutron stream, said shutter means comprising a fabricated cylindrical member having a laminated central portion which comprises a plurality of superposed, alternate laminations of sheet material having high neutron capture capabilities and sheet material having low neutron capture capabilities, said laminations being so supported that the surface planes thereof extend parallel to the axis of said cylindrical member, means supporting said cylindrical member for rotation about the axis thereof, means for detecting neutrons permitted to pass by said shutter means, means for counting detected neutrons, and means for selectively operating said neutron counting means including a light source, reflecting means rotating with said cylindrical member, and a reflected light receiving means.

3. Neutron velocity selector apparatus comprising a rotatable shutter which includes a plurality of superposed, alternate laminations of material having high neutron capture capabilities and material having low neutron capture capabilities, said shutter being movable to a closed, neutron blocking position and to an open, neutron transmitting position during each revolution thereof, a mirror rotatable with said shutter, a source of light, and a photocell positioned to receive light reflected from said source by said mirror at a predetermined time following each opening of said shutter.

4. Neutron velocity selector apparatus comprising a rotatable shutter which includes a fabricated, cylindrical member having a laminated central portion consisting of a plurality of superposed, alternate laminations of sheet material having high neutron capture capabilities and sheet material having low neutron capture capabilities, said laminations being so supported that the surface planes thereof extend parallel to the longitudinal axis of said cylindrical member, said shutter being movable to a closed, neutron, blocking position and to open neutron transmitting position during each revolution thereof, a mirror rotatable with said shutter, a source of light, and a photocell positioned to receive light reflected from said source by said mirror at a predetermined time following each opening of said shutter.

5. Neutron velocity selector apparatus comprising a rotatable shutter which includes a fabricated, cylindrical member having a laminated central portion consisting of a plurality of superposed, alternate laminations of sheet material having high neutron capture capabilities and sheet material having low neutron capture capabilities, said laminations being so supported that the surface planes thereof extend parallel to the longitudinal axis of said cylindrical member, said shutter being movable to a closed, neutron blocking position and to an open neutron transmitting position during each half revolution thereof, a pair of angularly spaced mirrors rotatable with said shutter, a source of light, and a photocell positioned to receive light reflected from said source by one of said mirrors at a predetermined time following each opening of said shutter.

6. Neutron velocity selector apparatus comprising a rotatable shutter which includes a hollow, cylindrical support member of a material having low neutron capture capabilities and a plurality of superposed, alternate laminations of sheet material having high neutron capture capabilities and sheet material having low neutron capture capabilities, symmetrically disposed within said support member with the surface planes thereof extending parallel to the axis of said member, said shutter being movable to a closed, neutron blocking position and to an open, neutron transmitting position during each half revolution thereof, a pair of angularly spaced mirrors rotatable with said shutter, a source of light and a photocell positioned to receive light reflected from said source by one of said mirrors at a predetermined time following each opening of said shutter.

7. In combination, a beam source of neutrons, normally inactive neutron detection apparatus including an ion chamber which is positioned to receive neutron radiation from said beam source, neutron velocity selector means located intermediate said ion chamber and said beam source, said velocity selector means comprising a rotatable shutter which includes a cylindrical member having a laminated central portion consisting of a plurality of superposed, alternate laminations of sheet material having high neutron capture capabilities and sheet material having low neutron capture capabilities, said laminations being so supported that the surface planes thereof extend parallel to the longitudinal axis of said cylindrical member, said shutter being movable to a closed, neutron blocking position and to an open, neutron transmitting position during each revolution thereof, and means actuable to activate said neutron detection means for a predetermined short period of time following each opening of said shutter, said actuating means including a mirror rotatable with said shutter, a source of light, and a photocell positioned to receive light reflected from said light source by said mirror at a predetermined time following each opening of said shutter.

8. In combination, a beam source of neutrons, normally inactive, neutron detection apparatus including an ion chamber which is positioned to receive neutron radiation from said beam source, neutron velocity selector means located intermediate said ion chamber and said beam source, said velocity selector means comprising a rotatable shutter which includes a cylindrical member having a laminated central portion consisting of a plurality of superposed, alternate laminations of sheet material having high neutron capture capabilities and sheet material having low neutron capture capabilities, said laminations being so supported that the surface planes thereof extend parallel to the longitudinal axis of said cylindrical member, said shutter being movable to a closed, neutron blocking position and to an open neutron transmitting position during each half revolution thereof, and means actuable to activate said neutron detection means for a predetermined short period of time following each opening of said shutter, said activating means including a pair of angularly spaced mirrors rotatable with said shutter, a source of light, and a photocell positioned to receive light reflected from said light source by one of said mirrors at a predetermined time following each opening of said shutter.

9. In combination, a beam source of neutrons, normally inactive neutron detection apparatus including an ion chamber which is positioned to receive neutron radiation from said beam source, neutron velocity selector means located intermediate said ion chamber and said beam source, said velocity selector means comprising a rotatable shutter which includes a hollow, cylindrical support member of a material having low neutron capture capabilities, and a plurality of superposed, alternate laminations of sheet material having high neutron capture capabilities and sheet material having low neutron capture capabilities symmetrically disposed within said support member with the surface planes thereof extending parallel to the axis of said member, said shutter being movable to a closed, neutron blocking position and to an open, neutron transmitting position during each half revolution thereof, and means actuable to activate said neutron detection means for a predetermined short period of time following each opening of said shutter, said actuating means including a pair of angularly spaced mirrors rotatable with said shutter, a source of light, and a photocell positioned to receive light reflected from said source by one of said mirrors at a predetermined time following each opening of said shutter.

10. A shutter for use in neutron velocity selector apparatus comprising a plurality of superposed, alternate laminations of sheet material having high neutron capture capabilities and sheet material having low neutron capture capabilities, and means supporting said laminations for rotation about an axis which is parallel to the surface planes of said laminations.

11. A shutter for use in neutron velocity selector apparatus comprising a fabricated, cylindrical member having a laminated central portion which comprises a plurality of superposed, alternate laminations of sheet material having high neutron capture capabilities and sheet material having low neutron capture capabilities, said laminations being so supported that the surface planes thereof extend parallel to the axis of said cylindrical member, and means supporting said cylindrical member for rotation about the axis thereof.

12. A shutter for use in neutron velocity selector apparatus comprising a hollow, cylindrical member of a material having low neutron capture capabilities, a plurality of superposed, alternate laminations of sheet material having high neutron capture capabilities and sheet material having low neutron capture capabilities symmetrically disposed within said hollow cylindrical member with the surface planes of said laminations extending parallel to the axis of said member, and means supporting said cylindrical member for rotation about the axis thereof.

13. A shutter for use in neutron velocity selector apparatus comprising a plurality of superposed, alternate laminations of sheet aluminum and sheet cadmium, and means supporting said laminations for rotation about an axis which is parallel to the surface planes of said laminations.

14. A shutter for use in neutron velocity selector apparatus comprising a fabricated, cylindrical member having a laminated central portion which comprises a plurality of superposed, alternate laminations of sheet aluminum and sheet cadmium, said laminations being so supported that the surface planes thereof extend parallel to the axis of said cylindrical member, and means supporting said cylindrical member for rotation about the axis thereof.

15. A shutter for use in neutron velocity selector apparatus comprising a hollow, cylindrical member of a material having low neutron capture capabilities, a plurality of superposed, alternate laminations of sheet aluminum and sheet cadmium symmetrically disposed within said hollow cylindrical member with the surface planes of said laminations extending parallel to the axis of said member, and means supporting said cylindrical member for rotation about the axis thereof.

16. In combination, a beam source of neutrons, means for alternately blocking the beam and permitting the beam to pass mounted in the path of said beam, said means comprising a plurality of superimposed alternate laminations of sheet material having high neutron capture capabilities and sheet material having low neutron capture capabilities, means supporting said laminations for rotation about an axis which is parallel to the surface planes of said laminations, normally inactive means for detecting neutrons permitted to pass by said means for blocking neutrons, and means to actuate said neutron detecting means for at least one predetermined short interval of time following the passing of neutrons through the means for blocking neutrons, said means including at least one mirror rotatable with the laminations, a source of light, and at least one photocell positioned to receive light reflected from said light source by a mirror at a predetermined time following each passage of neutrons through the blocking means.

17. The method of measuring the intensity of neutrons of a given velocity in a beam of neutrons comprising placing a number of spaced parallel sheets of neutron absorbing material in the path of a beam of neutrons with the surfaces of the sheets parallel to the path of the neutrons, turning the sheets whereby the beam of neutrons is interrupted, and measuring the intensity of those neutrons impinging on a given point at a distance from the sheets during an interval of time taken after the lapse of a period of time from the time that the sheets obstructed the beam.

18. The method of measuring the intensity of a velocity component in a neutron beam comprising: placing a number of spaced parallel sheets of neutron absorbing material in the path of the neutron beam, continuously rotating said sheets about a central axis which is parallel to the surface of the sheets, and measuring the intensity of those neutrons impinging on a given point at a distance from the neutron absorbing sheets during an interval of time taken after the lapse of a period of time from the time that the sheets obstructed the path of the beam.

19. The method of measuring the intensity of a velocity component in a neutron beam comprising: placing a number of spaced parallel sheets of neutron absorbing material in the path of a beam of neutrons, continuously rotating said sheets about a central axis which is parallel to the surface of the sheets, and measuring the intensity of those neutrons impinging on a given point at a distance from the neutron absorbing sheets during an interval of time, said interval commencing after the lapse of a period of time after the parallel sheets obstruct the neutron beam equal to the time required for the slowest neutron of those neutrons having a velocity greater than the velocity component desired to traverse the distance from the sheets to the given point, and terminating just before the period of time elapses that is required for the fastest neutron of those having a velocity less than the velocity component desired to be measured to traverse the aforedefined distance.

ENRICO FERMI.

REFERENCES CITED

The following references are of record in the file of this patent:

UNITED STATES PATENTS

| Number | Name | Date |
| --- | --- | --- |
| 2,275,748 | Fearon | Mar. 10, 1942 |